(12) United States Patent
Forster

(10) Patent No.: US 8,730,045 B2
(45) Date of Patent: May 20, 2014

(54) ISOLATING AND RFID-BASED SENSOR FROM ENVIRONMENTAL INTERFERENCE

(75) Inventor: Ian J. Forster, Essex (GB)

(73) Assignee: Avery Dennison Corporation, Glendale, CA (US)

(*) Notice: Subject to any disclaimer, the term of this patent is extended or adjusted under 35 U.S.C. 154(b) by 596 days.

(21) Appl. No.: 12/969,737

(22) Filed: Dec. 16, 2010

(65) Prior Publication Data

US 2012/0153968 A1    Jun. 21, 2012

(51) Int. Cl.
*G08B 13/14* (2006.01)

(52) U.S. Cl.
USPC ........................................ 340/572.8

(58) Field of Classification Search
USPC ........ 340/572.8, 572.1–572.7, 10.1; 324/600; 343/700 R
See application file for complete search history.

(56) References Cited

U.S. PATENT DOCUMENTS

| | | | |
|---|---|---|---|
| 6,329,915 B1 | 12/2001 | Brady et al. | |
| 7,446,660 B2 | 11/2008 | Posamentier | |
| 7,570,169 B2 | 8/2009 | Li et al. | |
| 7,605,706 B2 | 10/2009 | Khatri | |
| 7,928,922 B2 * | 4/2011 | King | 340/572.8 |
| 8,018,342 B2 * | 9/2011 | Monk et al. | 340/572.1 |
| 8,169,322 B1 * | 5/2012 | Zhan et al. | 340/572.7 |
| 2006/0017545 A1 | 1/2006 | Volpi et al. | |
| 2008/0135614 A1 | 6/2008 | Werner et al. | |
| 2009/0058658 A1 * | 3/2009 | Kai et al. | 340/572.7 |
| 2009/0146810 A1 | 6/2009 | Monk | |
| 2009/0255945 A1 * | 10/2009 | Lewis | 220/737 |
| 2010/0123586 A1 * | 5/2010 | Baba et al. | 340/572.8 |

FOREIGN PATENT DOCUMENTS

EP    1962232    8/2008

OTHER PUBLICATIONS

International Search Report dated Feb. 13, 2012 for International Application No. PCT/US2011/063236 filed Dec. 5, 2011.
Written Opinion dated Feb. 13, 2012 for International Application No. PCT/US2011/063236 filed Dec. 5, 2011.

* cited by examiner

*Primary Examiner* — Phung Nguyen
(74) *Attorney, Agent, or Firm* — Avery Dennison Corporation

(57) ABSTRACT

An RFID-based sensor is provided with an RFID chip and an antenna electrically connected to the RFID chip. The antenna is adapted to receive energy from an RF field and produce a signal. The sensor also includes a sensing material electrically connected to the antenna and having an electrical property which varies in the presence of an environmental factor. The sensor is further provided with a dielectric spacer material and a ground element which is adapted to at least partially isolate the sensing material from the environmental factor.

20 Claims, 3 Drawing Sheets

ISOLATING AND RFID-BASED SENSOR FROM ENVIRONMENTAL INTERFERENCE

FIELD OF THE DISCLOSURE

The present subject matter relates to radio frequency identification ("RFID") devices. More particularly, the present subject matter relates to sensor devices incorporating RFID technology.

DESCRIPTION OF RELATED ART

Electrically powered devices for sensing a material or condition are well known. Recently, sensors incorporating RFID technology have been proposed as a means for providing a sensing function at a relatively low power requirement. Exemplary sensors incorporating RFID technology are described in U.S. Patent Application Publication No. 2008/0135614 to Werner et al., which is incorporated herein by reference. Such devices typically include material which is sensitive to a substance (e.g., an analyte) and an antenna electrically connected to each other. When the antenna is energized, it sends a signal to a receiver device or controller which analyzes the signal. One or more of the electrical properties of the sensing material, for example its resistance or complex dielectric constant, change when in the presence of the substance, which modifies the signal being transmitted by the antenna. The controller is programmed to analyze the modified signal and produce an output indicative of the presence of the substance in the vicinity of the sensing material and/or one or more properties of the substance.

One disadvantage of known RFID-based sensors is that the performance of the sensing material can be distorted by interference or "noise" caused by the surrounding environment. When the surrounding environment interferes with the performance of the sensing material, it is more difficult to resolve the wanted sensed parameter (i.e., the presence of the substance to be sensed). Accordingly, it would be advantageous to provide an RFID-based sensor capable of isolating the sensing material from an environmental influence which would degrade the performance of the sensor.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an RFID-based analyte sensor comprises an RFID chip and an antenna electrically connected to the RFID chip. The antenna is adapted to receive energy from an RF field and produce a signal. The sensor also includes a sensing material electrically connected to the antenna and having an electrical property which varies in the presence of an environmental factor. The sensor is further provided with a dielectric spacer material and a ground element which is adapted to at least partially isolate the sensing material from the environmental factor.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
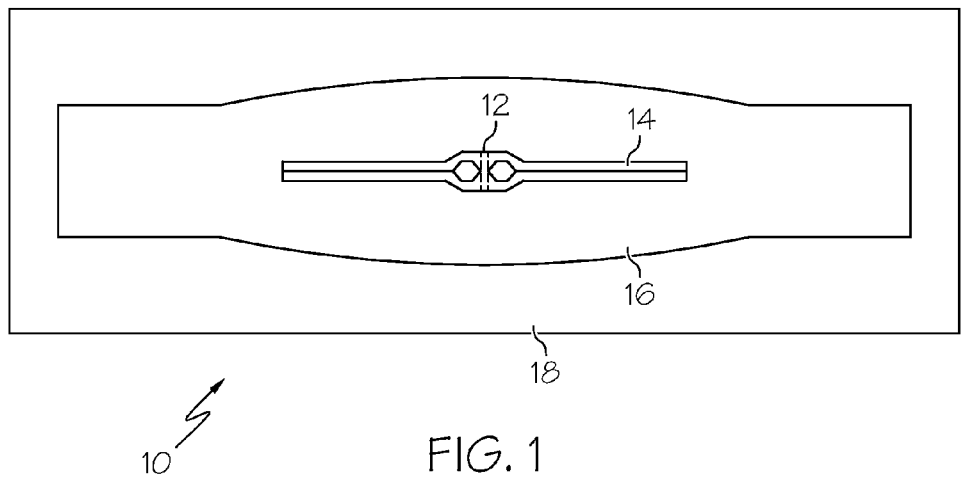
FIG. 1 is a top plan view of an RFID-based sensor according to an aspect of the present disclosure.

FIG. 1 shows an RFID-based device or sensor 10 according to the present disclosure. The sensor 10 comprises an RF communication chip 12, which may include an integrated circuit for controlling RF communication and other functions of the sensor 10.

The RF communication chip 12 is electrically connected or coupled to an antenna 14 which, in the illustrated embodiments, is directly adjacent to the chip 12, but may be spaced away from the chip 12 in other embodiments. The present invention contemplates the utilization of straps in order to facilitate a connection between the chip and the antenna. The antenna 14 is adapted to receive energy from an RF field and produce a signal which is transmitted to one or more external devices, such as a controller or reader or detector, which receives and analyzes the signal. The RF field may be generated by the device to which the antenna 14 transmits the signal or it may be generated by a different external device. The antenna 14 may be any of a variety of antenna types, such as a dipole antenna, loop antenna, slot antenna, or a hybrid combining characteristics of these antenna types.

The antenna 14 is electrically connected or coupled to a sensing material 16. The sensing material 16 has an electrical property which varies in the presence of a particular substance or condition. For example, the sensing material 16 may be adapted to have a dielectric constant or conductivity which changes when the sensing material 16 is in contact with or in the vicinity of the substance or condition. The signal produced by the antenna 14 will change when the electrical property of the sensing material 16 changes. Accordingly, if the signal transmitted by the antenna 14 is the same before and after the sensing material 16 is placed in an environment, it is indicative that there is none (or an insufficient amount) of the substance or condition present in the environment. On the other hand, if the RFID reader detects a difference between the signals, it is indicative that the substance or condition is present in the environment.

Figure 2:
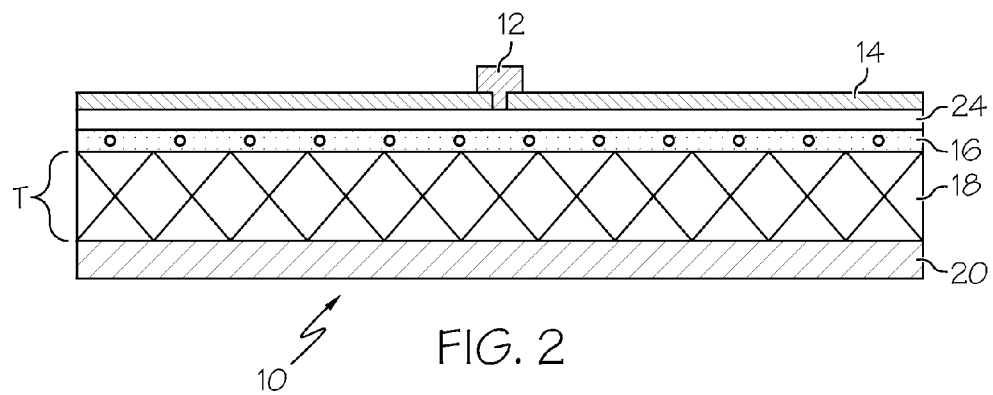
FIG. 2 is a schematic cross-sectional view of one embodiment of an RFID-based sensor according to an aspect of the present disclosure.
Figure 3:
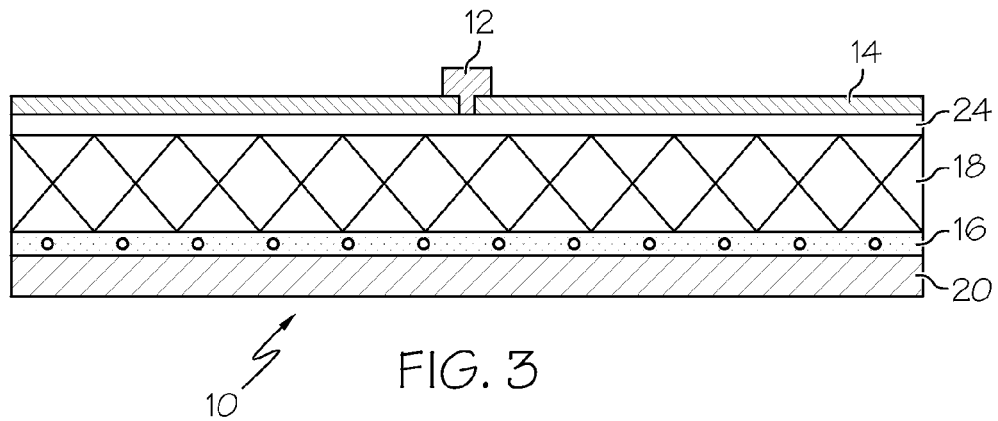
FIG. 3 is a schematic cross-sectional view of another embodiment of an RFID-based sensor according to an aspect of the present disclosure.

The sensing material 16 may be variously positioned with respect to the antenna 14. In the illustrated embodiments, the antenna 14 is positioned between the chip 12 and the sensing material 16 (i.e., the sensing material 16 is positioned "beneath" the antenna 14 in the orientation of FIGS. 2-4). However, in other embodiments, the sensing material 16 may be positioned between the chip 12 and the antenna 14 or coated or applied to the "top" of the antenna 14 (in the orientation of FIGS. 2-4). The sensing material 16 may be provided as a generally continuous layer or film (as in FIGS. 2 and 3) or may be present in discrete areas. Additionally, depending on the nature of the sensing material 16, it may be either in direct contact with the antenna 14 (FIG. 2) or spaced away from the antenna 14 (FIG. 3).

The sensor 10 further includes a spacer material or element 18 and/or a ground material or element 20, which functions to at least partially isolate the sensing material 16 from any environmental factors tending to interfere with proper operation of the sensing material 16. Even though the present invention predominately discusses the utilization of both a spacer element and ground material the present invention also contemplates that both components may be utilized independently of one another.

The spacer material 18 may be comprised of a variety of different materials having a variety of different electrical properties. In one embodiment, the spacer material 18 is a dielectric material. More particularly, the spacer material 18 may be provided as a dielectric foam material. The spacer material 18 may further comprise a combination of materials, such as foam impregnated with particles of a high dielectric constant material, depending on the properties desirable of the spacer material 18.

The spacer material 18 may be variously positioned with respect to the sensing material 16. In the embodiment of FIG. 2, the sensing material 16 is positioned between the antenna 14 and the spacer material 18 (i.e., the spacer material 18 is positioned "beneath" the sensing material 16 in the orientation of FIG. 2). This configuration may be advantageous if the sensing material 16 is of the type having a dielectric constant which varies in the presence of a particular substance or condition.

Proximity to a conductive surface, such as the ground element 20, can affect the bandwidth of an antenna. In particular, the impedance and radiation efficiency of an antenna which is adjacent to a conductive surface will change more rapidly with frequency than for a similar type of antenna which is not in proximity to a conductive surface. With an RFID-based device or sensor, the response of the device is related to the power transfer between the device and the antenna. In general, if the impedance of the antenna is changing more rapidly with frequency (e.g., when the antenna is in the proximity of a conductive surface), a matched condition (giving optimal or near-optimal power transfer) can only be achieved over a smaller frequency range. Thus, for the foregoing reasons, the sensing material 16 may be separated from the ground element 20 by the spacer material 18, as shown in FIG. 2.

The thickness of the spacer material 18 is one of the factors that affects the bandwidth of the antenna 14 and, hence, the bandwidth of the sensor 10. In general, the thinner the spacer material 18 is, the narrower the frequency response will be. A thicker spacer material 18 will thus have a broader frequency response. The benefits of a relatively narrow frequency response can be better understood with an example.

An example of a system remotely monitoring the sensitivity of an RFID device or sensor 10 is one having a noise level of +/−0.25 dB. One RFID device (referred to herein as "Tag 1") has a peak sensitivity at a frequency F1. The sensitivity of Tag 1 drops by 0.5 dB at +/−10 MHz from F1. A second RFID device (referred to herein as "Tag 2") also has a peak sensitivity at F1, but its sensitivity drops by 5 dB at +/−10 MHz from F1. The difference in the sensitivity of the tags at off-center frequencies is indicative of the width of their respective frequency response, and it can be said that Tag 2 has a narrower frequency response than Tag 1. The remote monitoring system takes a series of measurements of the frequency responses of the tags and, when considering Tag 1, it becomes very difficult for the system to determine the center frequency F1 due to the small variation from the peak sensitivity at other frequencies. In particular, methods involving long duration integration and averaging, assuming that the noise is random, may be required to determine F1. In contrast, the center frequency F1 of Tag 2 can be accurately measured in one scan of the frequency range due to its relatively narrow frequency response (i.e., the greater variation from the peak sensitivity at off-center frequencies).

Therefore, it will be seen that there are competing interests which alternatively promote a thicker layer of spacer material 18 (to make the impedance of the sensor 10 more independent from frequency changes) and a thinner layer of spacer material 18 (to create a narrower frequency response which makes it easier to extract a measured variable). These and other factors (including the dielectric constant of the spacer material 18, the desired overall design and functionality of the sensor 10, and the ease and cost of manufacturing the sensor 10, etc.) may be considered when selecting the thickness of the spacer material 18.

In the embodiment of FIG. 3, juxtaposition of selected materials is reversed with respect to FIG. 2, with the spacer material 18 being positioned between the sensing material 16 and the antenna 14 (i.e., the sensing material 16 is positioned "beneath" the spacer material 18 in the orientation of FIG. 3). Such a configuration may be advantageous if the sensing material 16 is of the type having a conductivity which varies in the presence of a particular substance or condition.

Figure 4:
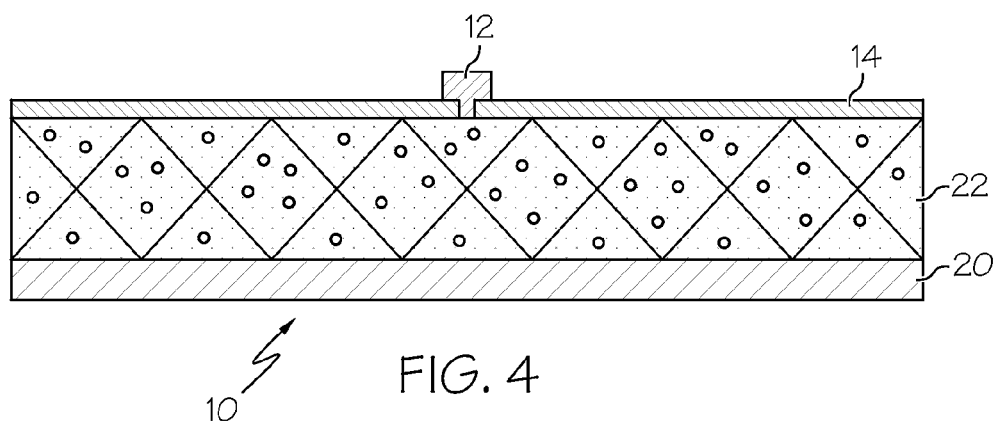
FIG. 4 is a schematic cross-sectional view of yet another embodiment of an RFID-based sensor according to an aspect of the present disclosure.

FIGS. 2 and 3 illustrate a separate sensing material 16 and spacer material 18, but the two may be combined in a single layer or structure 22, as illustrated in FIG. 4. Depending on the nature of the sensing material and the spacer material, a variety of methods may be employed to combine the two into a single layer, and the present disclosure is not limited to a particular method of forming an integrated sensing/spacing structure.

The ground element 20 at least partially isolates the sensing material 16 from disruptive environmental factors. The sensing material 16 may be sensitive to environmental factors (e.g., physical parameters or chemical/biological entities) separate from the parameter(s) it is intended to monitor. By providing the sensor 10 with a ground element 20, the sensing material 16 (and hence the signal transmitted by the antenna 14) is at least partially isolated from such "noise." In particular, the ground element 20 may be useful in counteracting noise arising from the surface on which the sensor 10 is mounted, such as merchandise or packaging. In this way, the sensor 10 may be made surface-insensitive, increasing the scope of environments in which the sensor 10 may reliably function and allowing the sensor 10 to be read in both near and far RFID fields in such environments. To that end, it may be advantageous for the ground element 20 to be positioned on the opposite end of the sensor 10 from the chip 12 (i.e., at the "bottom" of the sensor 10 in the orientation of FIGS. 2-4). In such a configuration, the ground element 20 is positioned against a mounting surface of the environment and the chip 12 faces away from that surface. The ground element 20 is positioned between the mounting surface and the sensing material 16, thereby at least partially isolating the sensing material 16 from any disruptive effects arising from the mounting surface.

The configuration of the ground element 20 may vary according to the nature of the sensing material 16 and/or the nature of the environmental factor(s) to be counteracted. In one embodiment, the ground element 20 is comprised of a metallic material, which may be advantageous for isolating the sensing material 16 from a variety of disruptive environmental factors, such as the complex dielectric constant, magnetic properties or conductivity of the environment behind the ground plane. A metallic ground plane can also be effective in reducing the effect of other RFID tags in proximity, for example if an array of tags was used sensitive to different analytes to give information on a broad range of materials, the ground plane would allow the tags to operate independently if correctly positioned. The ability of the present invention to isolate a RFID tag of interest from signals from tags in the surrounding environment of the tag of interest is beneficial when keeping inventory of RFID sensors of the present invention. In other embodiment, the ground/isolating element 20 may be comprised of other materials such as, but not limited to, combinations of high dielectric constant and high permeability materials, which may also achieve a degree of isolation from dielectric and magnetic properties of the surface behind the ground element other suitable materials include foam, foil, metal laminate.

The present invention contemplates that the RFID device of the present invention may be either passive or active. If active, an internal power source may also be provided as an essential element of the sensor.

In one embodiment of the present invention, an underlayer of adhesive layer may be applied to the ground material 20 if a surface of the ground material 20 is facing the external environment. The present invention contemplates that a release liner may be applied to the adhesive layer in order to protect the integrity of the adhesive layer. The adhesive layer may be a removable adhesive layer. An example of a suitable adhesive for the sensor of the present invention is a pressure sensitive adhesive.

Figure 5:
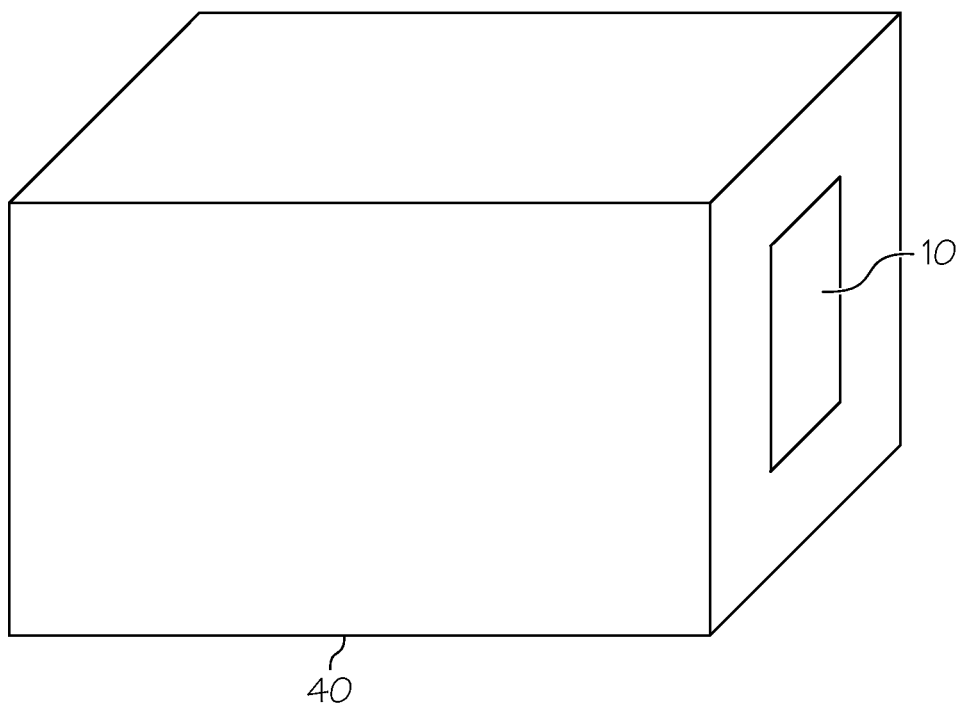
FIG. 5 is an illustration of an RFID-based sensor adhered to an object.

FIG. 5 of the present invention illustrates the RFID sensor 10 of the present invention adhered to an object. The sensor may be placed in a variety of positions on the object wherein the positioning of the sensor does not have an impact on the readability or sensing capability of the device.

The present invention contemplates that the RFID device of the present invention may be manufactured using a roll manufacturing method.

In one embodiment of the present invention the RFID device has the capability to isolate the sensing material 16. For instance, the spacer material or element 18 and/or the ground material or element 20 may isolate the sensing material from frequencies that fall outside the ultra high frequency range. In another embodiment of the present invention, the spacer material or element 18 and/or the ground material are capable of isolating the sensing material from those frequencies that fall within the high frequency range.

In one embodiment, the present invention is utilized in biological capacity. The present invention contemplates that the sensing material 16 of the present invention is capable of sensing temperature, blood flow, and other human biological elements. The RFID component of the sensor of the present invention allows for the input of data into the sensor regarding a patient as well as the storage of information regarding a particular patient or other subject matter for later readability.

The present invention as illustrated in FIG. 6 also provides a method for constructing a RFID device of the present invention. First, a spacer material 18 having an upper and lower surface is provided over a ground material. A sensing material is placed upon the upper surface of the spacer material. A substrate having a chip coupled to an antenna is then provided on top of the spacer material.

Other elements (e.g., the substrate layer 24 shown in FIGS. 2 and 3) may also be incorporated into the sensors disclosed herein without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

What is claimed is:

1. An RFID-based sensor, comprising:
an RFID chip;
an antenna electrically connected to the RFID chip and adapted to receive energy from an RF field and produce a signal;
a sensing material electrically connected or coupled to the antenna and having an electrical property which varies in the presence of an environmental factor;
a dielectric spacer material disposed on the sensing material; and
a ground element or isolator element adapted to at least partially isolate the sensing material from the environmental factor; and
wherein the spacer material comprises a dielectric foam material.

2. The sensor of claim 1, wherein the sensing material is separated from the ground element.

3. The sensor of claim 2, wherein the sensing material is separated from the ground element by the spacer material.

4. The sensor of claim 1, wherein the spacer material is positioned directly adjacent to the ground element.

5. The sensor of claim 1, wherein the sensing material is positioned directly adjacent to the ground element.

6. The sensor of claim 1, wherein the spacer material is separated from the ground element.

7. The sensor of claim 1, wherein the ground element comprises a metallic material.

8. The sensor of claim 1, wherein the electrical property is the conductivity of the sensing material.

9. The sensor of claim 1, wherein the electrical property is the dielectric property of the sensing material.

10. The sensor of claim 1, wherein the electrical property is the magnetic property of the sensing material.

11. The sensor of claim 1, wherein the electrical property is a combination of one or more of conductivity, complex dielectric constant and complex magnetic permeability.

12. The sensor of claim 1, wherein the sensing material is positioned beneath the antenna.

13. The sensor of claim 1, wherein the sensing material is on top of the antenna.

14. The sensor of claim 13, wherein the sensing material is provided as a coating.

15. The sensor of claim 14, wherein the coating is provided in discrete areas.

16. The sensor of claim 1, wherein the ground element has a layer of pressure sensitive adhesive applied thereto.

17. An RFID-based sensor, comprising:
an RFID chip;
an antenna electrically connected to the RFID chip and adapted to receive energy from an RF field and produce a signal;

a sensing material electrically connected or coupled to the antenna and having an electrical property which varies in the presence of an environmental factor;

a dielectric spacer material at least partially incorporated into the sensing material; and a ground element or isolator element adapted to at least partially isolate the sensing material from the environmental factor; and wherein the spacer material comprises a dielectric foam material.

18. The sensor of claim 17, wherein the sensing material and dielectric spacer material are separated from the ground element.

19. The sensor of claim 17, wherein the sensing material and dielectric spacer material are positioned directly adjacent to the ground element.

20. The sensor of claim 17, wherein the electrical property includes at least one of conductivity, complex dielectric constant and complex magnetic permeability.

* * * * *